(12) United States Patent
Kestner et al.

(10) Patent No.: US 9,585,504 B2
(45) Date of Patent: Mar. 7, 2017

(54) GRANULAR DISPENSER

(71) Applicant: Prince Castle LLC, Carol Stream, IL (US)

(72) Inventors: Kyle Kestner, Schaumburg, IL (US); Scott R. Hammac, Joliet, IL (US); Alexander Malevanets, Vernon Hills, IL (US); Aleksandr Yazvin, Glenview, IL (US); Zack McCoy, South Elgin, IL (US); Eric Larson, Chicago, IL (US); Edward Eaton, Eola, IL (US)

(73) Assignee: Prince Castle LLC, Carol Stream, IL (US)

( * ) Notice: Subject to any disclaimer, the term of this patent is extended or adjusted under 35 U.S.C. 154(b) by 0 days.

(21) Appl. No.: 14/850,492

(22) Filed: Sep. 10, 2015

(65) Prior Publication Data

US 2016/0088961 A1    Mar. 31, 2016

Related U.S. Application Data

(60) Provisional application No. 62/056,270, filed on Sep. 26, 2014.

(51) Int. Cl.
*A47G 19/34*    (2006.01)
*G01F 11/18*    (2006.01)
*G01F 11/26*    (2006.01)
*A47F 1/035*    (2006.01)
*B65D 83/04*    (2006.01)
(Continued)

(52) U.S. Cl.
CPC .............. *A47G 19/34* (2013.01); *G01F 11/18* (2013.01); *A47F 1/035* (2013.01); *B65D 83/0409* (2013.01); *B65D 83/525* (2013.01); *G01F 11/263* (2013.01); *G01F 13/006* (2013.01)

(58) Field of Classification Search
CPC .......... A23P 1/082; A23L 1/005; A23L 1/217; G01F 13/006; G01F 11/18; G01F 11/263; A47G 19/34; A47F 1/035; B65D 83/525; B65D 83/0409
USPC ....... 118/13, 24, 31; 222/287–288, 436–438, 222/189.02–189.06, 359, 361–362, 222/447–448, 185.1, 453, 368
See application file for complete search history.

(56) References Cited

U.S. PATENT DOCUMENTS 448,275 A * 3/1891 Stowell ................... G01F 11/32
                                                        222/449
1,171,575 A   2/1916 Zsidakovitz
(Continued)

FOREIGN PATENT DOCUMENTS

WO        2009029790 A1    3/2009

OTHER PUBLICATIONS

MagicPinch Sugar Dispenser Owner's Manual by GSJ Magic, Inc., dated 2001.

*Primary Examiner* — Paul R Durand
*Assistant Examiner* — Andrew P Bainbridge
(74) *Attorney, Agent, or Firm* — Andrus Intellectual Property Law, LLP

(57) ABSTRACT

A dispenser for granular material such as sugar and salt or other granular ingredients, including a collection portion and metering chamber. A metering cartridge located in the metering chamber includes a portion recess which collects a predetermined amount of granular material to be dispensed. The metering chamber is actuated and the granular material located in the portion recess is dispensed.

18 Claims, 18 Drawing Sheets

(51) Int. Cl.
*B65D 83/52* (2006.01)
*G01F 13/00* (2006.01)

(56) References Cited

U.S. PATENT DOCUMENTS

| | | | |
|---|---|---|---|
| 1,449,571 A | 3/1923 | Younger | |
| 1,547,953 A * | 7/1925 | Palmer | A47G 19/24 222/366 |
| 2,063,605 A * | 12/1936 | Janssens | G01F 11/12 222/284 |
| 2,473,585 A * | 6/1949 | Harwood | A47G 19/24 222/142.2 |
| 2,490,721 A | 12/1949 | Via | |
| 2,515,735 A | 7/1950 | Saunders | |
| 2,558,251 A | 6/1951 | Holsted | |
| 2,742,194 A | 4/1956 | Brown | |
| 3,040,937 A | 6/1962 | Lantery | |
| 3,141,582 A | 7/1964 | Kroodsma et al. | |
| 3,823,853 A | 7/1974 | Alden | |
| 4,006,842 A | 2/1977 | Bassignani | |
| 4,053,087 A * | 10/1977 | Lack | G01F 11/24 222/278 |
| 4,376,499 A * | 3/1983 | Ostergaard | A47G 19/34 222/339 |
| 4,448,331 A * | 5/1984 | Millette | G01F 11/24 222/185.1 |
| 4,991,748 A * | 2/1991 | Hackmann | B65D 83/0409 222/361 |
| 5,138,979 A | 8/1992 | Baird et al. | |
| 5,259,537 A | 11/1993 | Beers et al. | |
| 5,437,393 A * | 8/1995 | Blicher | G01F 11/24 141/369 |
| 5,437,396 A * | 8/1995 | Russillo | G01F 11/18 222/185.1 |
| 5,469,992 A | 11/1995 | Jenkins | |
| 5,641,096 A | 6/1997 | Robbins et al. | |
| 5,746,355 A * | 5/1998 | Wold | G01F 11/40 222/189.02 |
| 5,823,398 A * | 10/1998 | Russillo | A47G 19/34 222/185.1 |
| 5,839,619 A * | 11/1998 | Willer | G01F 11/263 222/368 |
| 5,934,573 A | 8/1999 | Weterrings et al. | |
| 6,189,742 B1 * | 2/2001 | Thomson | A47G 19/34 141/174 |
| 6,269,983 B1 | 8/2001 | Jones et al. | |
| 6,422,432 B1 * | 7/2002 | Alldredge | G01F 11/00 222/510 |
| 6,520,380 B1 * | 2/2003 | Veltrop | G01F 11/025 222/135 |
| 6,981,619 B2 * | 1/2006 | Moretto | B65D 90/582 141/192 |
| 7,228,993 B2 * | 6/2007 | Yang | G01F 11/18 222/365 |
| 7,861,749 B2 | 1/2011 | Gevorgian | |
| 7,922,044 B2 | 4/2011 | Luchinger | |
| 8,002,153 B2 | 8/2011 | Lowther | |
| 8,047,408 B2 | 11/2011 | Eaton et al. | |
| 8,181,827 B2 | 5/2012 | Long et al. | |
| 8,469,237 B2 * | 6/2013 | Thulin | G01F 11/10 222/181.1 |
| 8,783,164 B2 * | 7/2014 | Tanja | A47J 31/42 222/185.1 |
| 8,910,586 B2 * | 12/2014 | Redler | G01F 11/46 118/13 |
| 2003/0213820 A1 * | 11/2003 | Sherk, Jr. | G01F 11/24 222/518 |
| 2007/0062976 A1 * | 3/2007 | Blum | B65D 47/30 222/362 |
| 2013/0087575 A1 * | 4/2013 | Simmons | A47J 42/06 222/1 |
| 2013/0092705 A1 | 4/2013 | Simmons et al. | |
| 2013/0263781 A1 * | 10/2013 | Redler | G01F 11/46 118/712 |
| 2014/0131390 A1 | 5/2014 | Green et al. | |

\* cited by examiner

GRANULAR DISPENSER

CROSS-REFERENCE TO RELATED APPLICATION

The present application claims priority of U.S. Provisional Patent Application No. 62/056,270, filed on Sep. 26, 2014, the content of which is hereby incorporated herein by reference in its entirety.

BACKGROUND OF THE INVENTION

The present disclosure relates to granular dispensers. More particularly, the present disclosure relates to granular dispensers, with metered portion control.

It is known that most restaurants and food services strive to maintain product consistency, reduce preparation time, and control production costs. It is also known that many products produced in restaurants and food services are prepared using various types of granular materials.

Granular materials are applied to various food products by a variety of ways. The amount of granular materials applied to a food product may be inconsistent and the granular material distribution across a food product may not be uniform depending on the method of application selected. The amount of granular material added to a food product may not be uniform and oftentimes depends on the operator applying the granular material. Additionally, the portion of granular material added to a specific food product may need to be consistent across operators to maintain high standards of consistency in a restaurant or food service establishment. This is especially true in restaurant establishments where consistency among products at the same location necessarily need to be consistent as well as from restaurant to restaurant within the chain. A granular material dispenser able to provide consistent and controllable granular material applications would be an improvement over the prior art.

BRIEF DISCLOSURE

This summary is provided to introduce a selection of concepts that are further described herein below in the Detailed Description. This summary is not intended to identify key or essential features of the claimed subject matter, nor is it intended to be used as an aid in limiting the scope of the claimed subject matter.

An exemplary embodiment of a dispenser includes a hopper with a collection portion and a metering chamber. The metering chamber is adjacent the collection portion and extends through the hopper. The collection portion includes a sloped surface leading to a through-hole into the metering chamber. A metering cartridge includes at least a first portion recess oriented in a direction of the collection portion. The metering cartridge is translatable between a first position, and a second position. In the first position, the first portion recess is open to the through-hole. In the second position, the first portion recess extends exterior of the metering chamber.

An additional exemplary embodiment of a dispenser includes a hopper with a collection portion and a metering chamber. The metering chamber is adjacent the collection portion and extends through the hopper. The collection portion includes a sloped surface that terminates leading to the metering chamber. A metering cartridge includes at least a first portion recess and a second portion recess oriented in a direction of the collection portion. The metering cartridge is translatable between at least a first position, a second position, and a third position. In the first position, the first portion recess and second portion recess are open to the through-hole. In the second position, the first portion recess is closed to the through-hole and at least a portion of the first portion recess extends exterior of the metering chamber. In the third position, the first and second portion recesses are closed to the through-hole and at least portions of the first portion recess and the second portion recess extend exterior of the metering chamber.

BRIEF DESCRIPTION OF THE DRAWINGS

Examples of the granular material dispenser are described with reference to the following drawing figures. The same numbers are used throughout the figures to reference like features and components.

DETAILED DISCLOSURE

Figure 1:
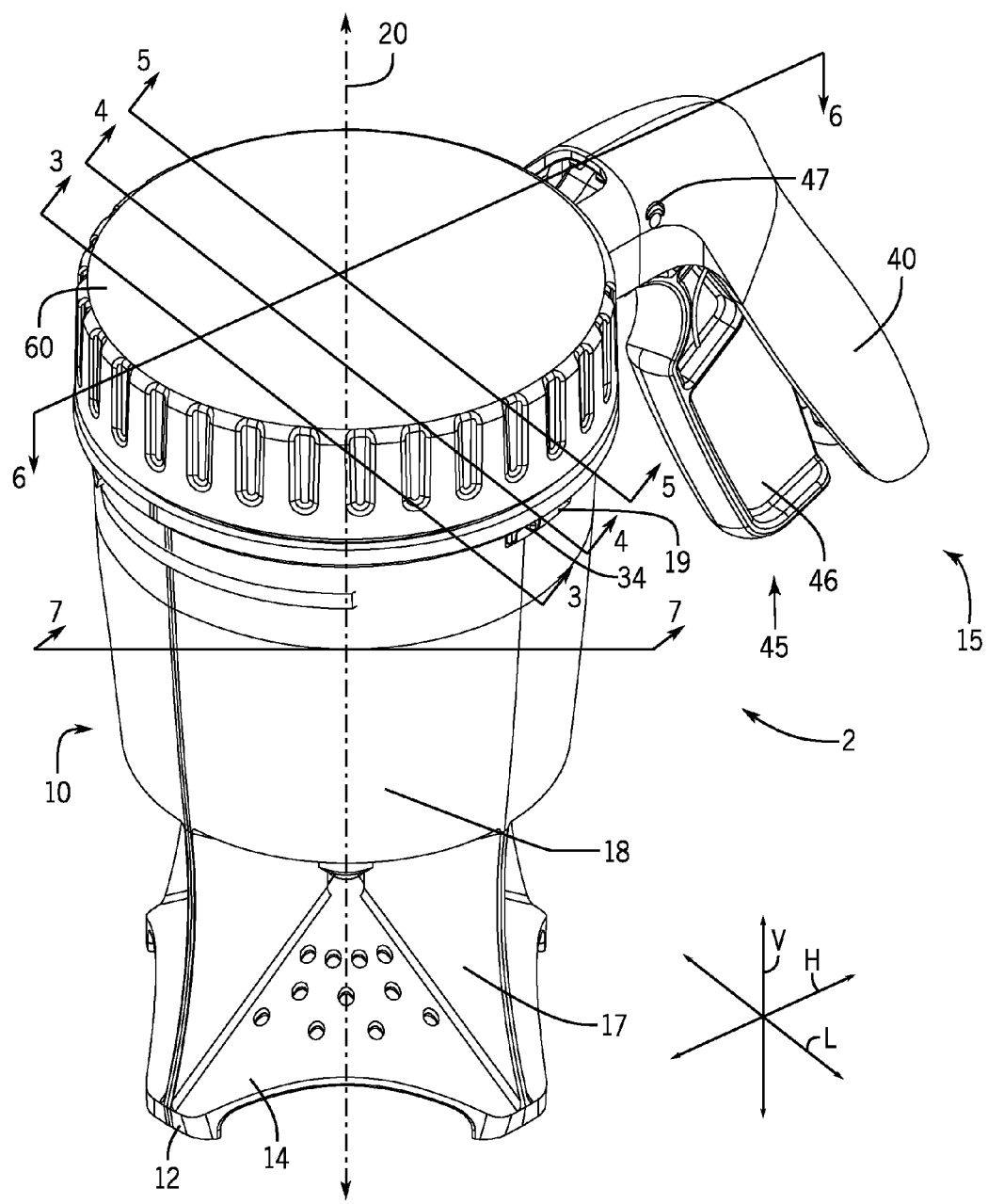
FIG. 1 is a front perspective view of an exemplary embodiment of a dispenser.

FIG. 1 depicts an exemplary embodiment of a dispenser 2. In embodiments, the dispenser 2 is purposed for dispensing granular materials in the food preparation/restaurant industry. Non-limiting examples of granular materials include salt, pepper, seasoned salt, dried herbs including but not limited to basil and oregano, and parmesan cheese, although these examples are merely exemplary and a person of ordinary skill will recognize other materials that may be dispensed, including non-granular materials based upon the present disclosure. The dispenser 2 includes a dispersion base 10, a hopper 25, an actuator assembly 15, and a lid 60 stacked in the vertical direction V. The dispenser 2, or portions therein, can be made of any suitable material including but not limited to plastic, metal, wood, and ceramic.

The dispersion base 10 includes a base portion 12, a distribution portion 14, a funnel portion 16, and an upper portion 18. The base portion 12 allows the dispenser 2 to stand in the vertical direction V when placed on a flat surface. It is also contemplated that the base portion 12 is the bottom surface of the distribution portion 14.

The distribution portion 14 deflects granular material in a distribution pattern when the granular material contacts it. In the preferred embodiment, this distribution portion 14 is a curved cone shape and symmetrical across a plurality of planes through a central axis 20. However, the distribution portion 14 may be any shape based on an intended distribution pattern. The distribution portion 14 may also include any number of holes, apertures, or funneling components to distribute the granular material.

The distribution portion 14 is connected to the funnel portion 16. In an exemplary embodiment, vertical walls 17 extend from the bottom of the funnel portion 16 and to the top of the distribution portion 14. Other structures may be used and arranged exemplarily to achieve a predetermined distribution pattern. The funnel portion 16 collects the granular material released from portion recesses 54a, 54b, to be discussed in greater detail below. The granular material collected by the funnel portion 16 exits the funnel portion 16 at the bottom of the funnel portion 16. The funnel portion 16, in the exemplary embodiment, is a cone shape. The funnel portion 16 may be shaped differently based upon an intended distribution pattern required.

The funnel portion 16 is connected to the upper portion 18. The upper portion 18 defines an interior space. The hopper 25, to be discussed in greater detail below, is located in the interior space defined by the upper portion 18. The upper portion 18 may be sized based on the hopper 25 and the granular material.

Figure 2:
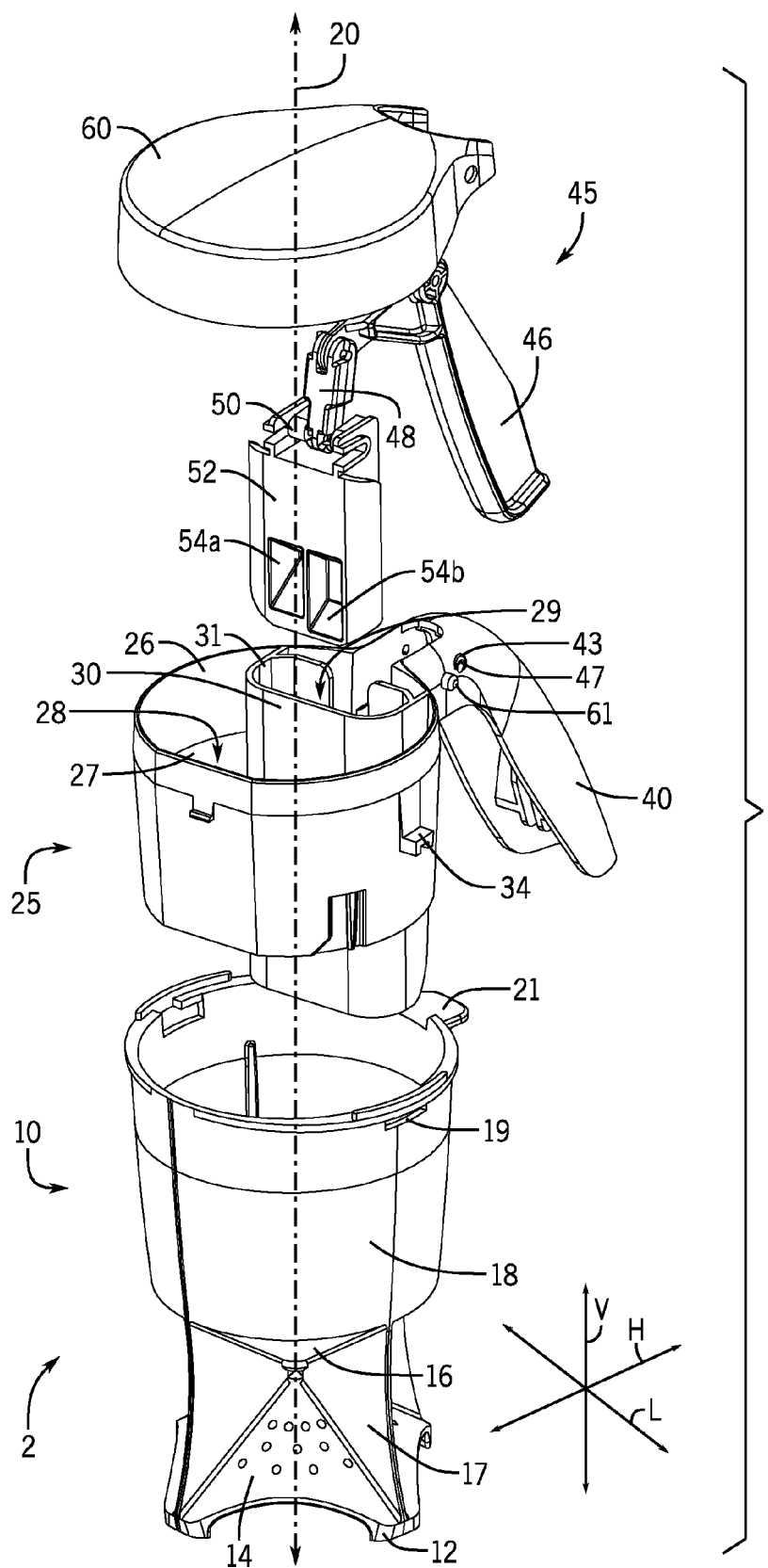
FIG. 2 is an exploded view of an exemplary embodiment of the dispenser.
Figure 3:
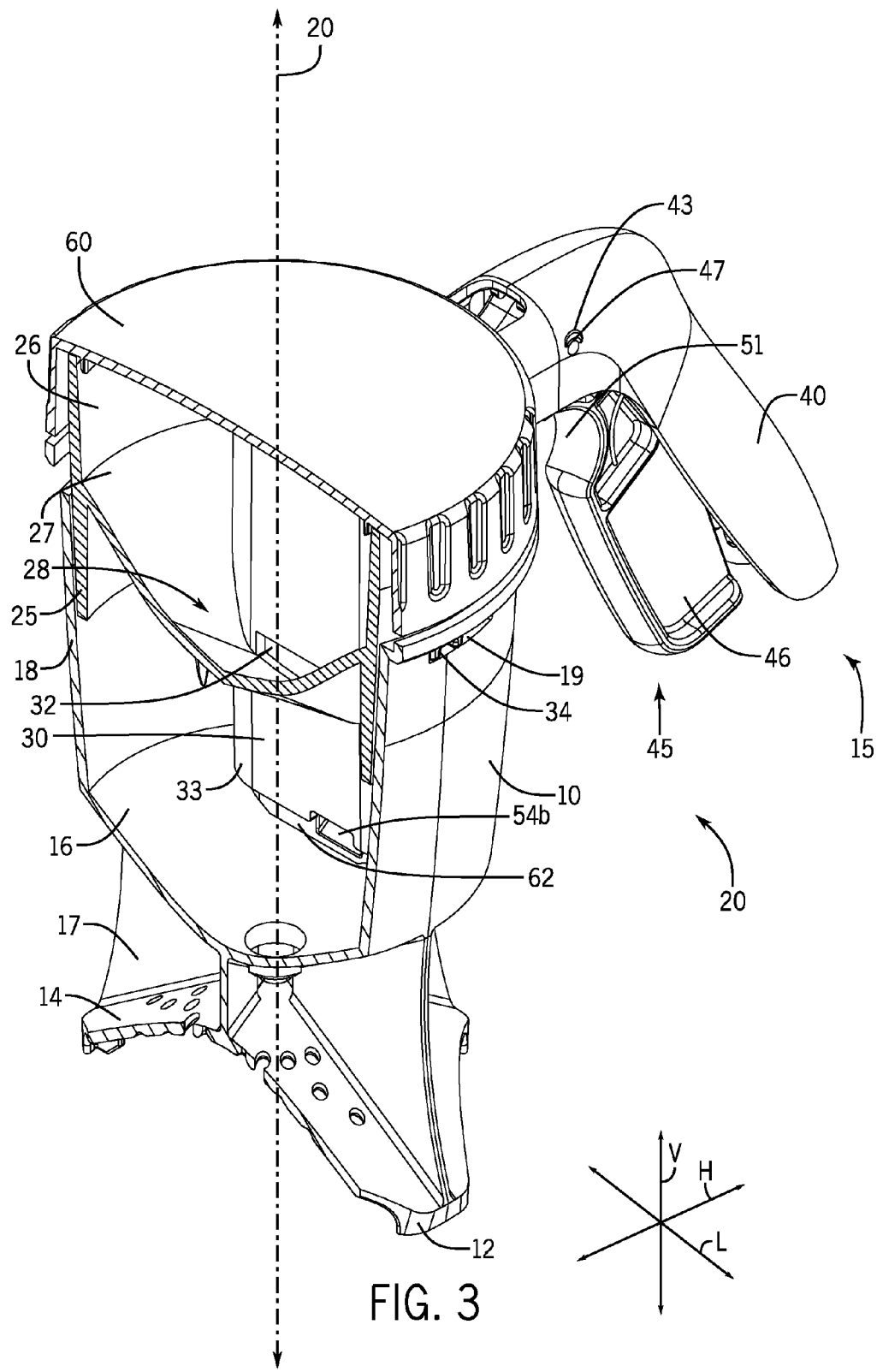
FIG. 3 is a sectional view taken along line 3-3 in FIG. 1.
Figure 4:
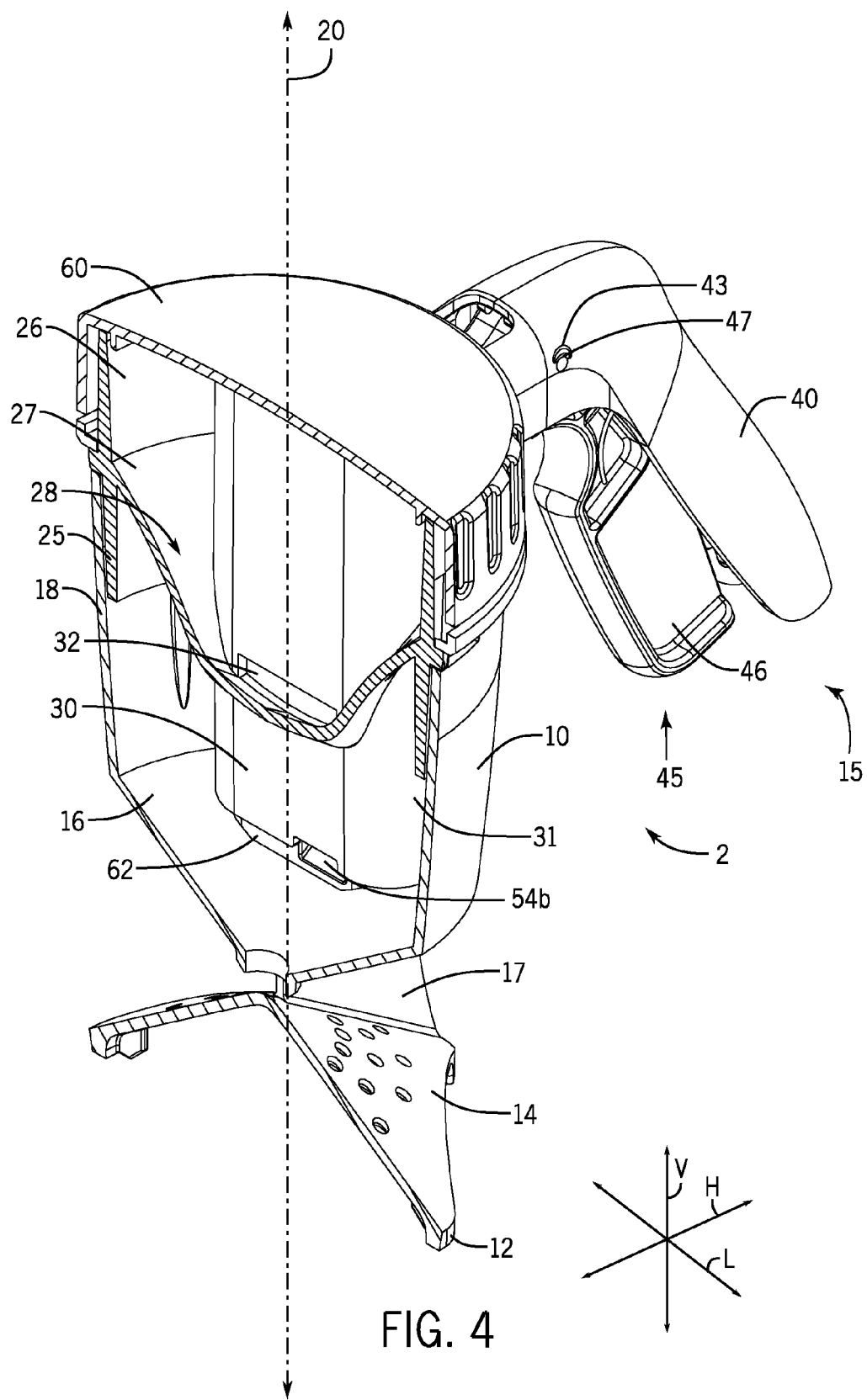
FIG. 4 is a sectional view taken along line 4-4 in FIG. 1.
Figure 5:
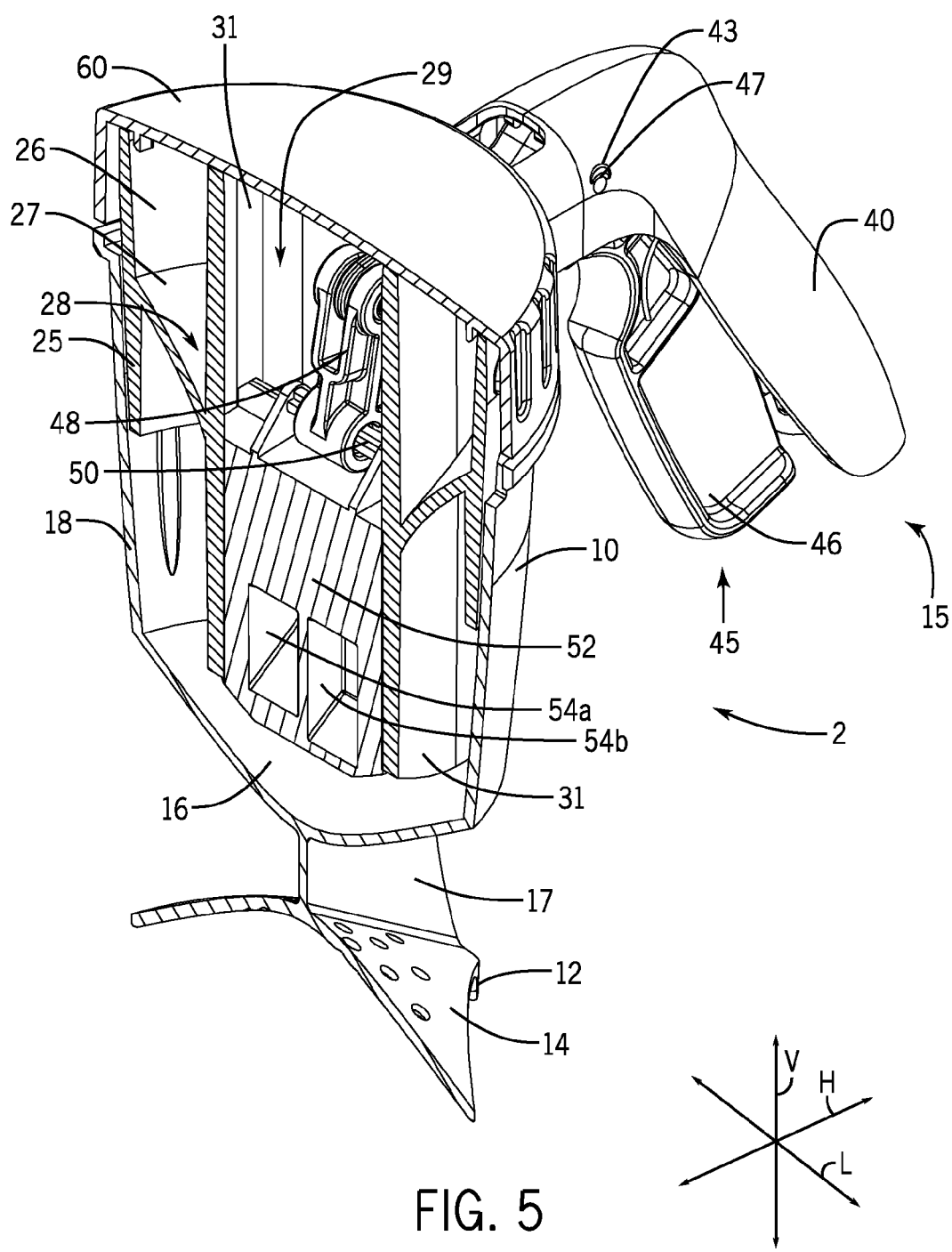
FIG. 5 is a sectional view taken along line 5-5 in FIG. 1.
Figure 6:
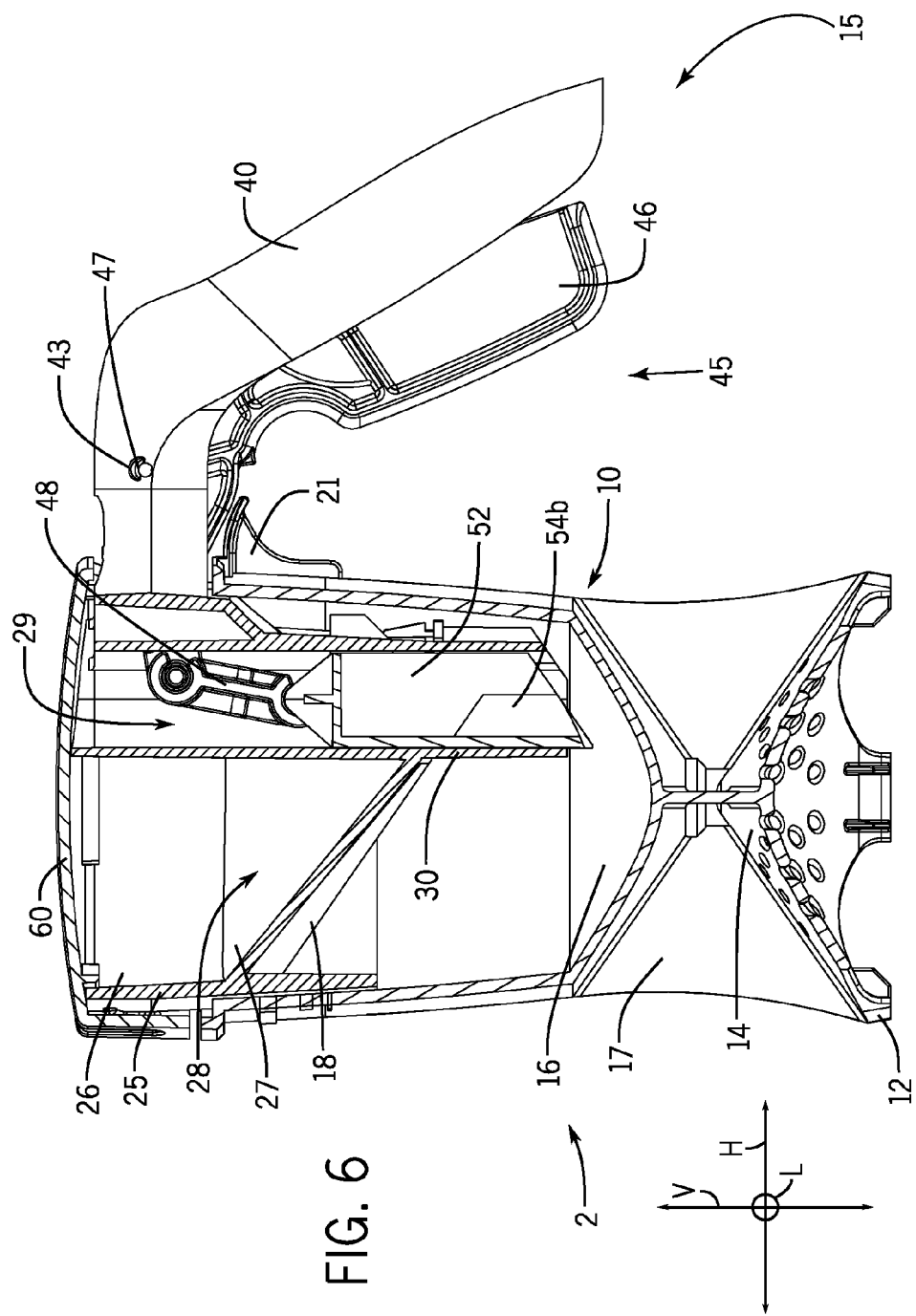
FIG. 6 is a sectional view taken along line 6-6 in FIG. 1.
Figure 7:
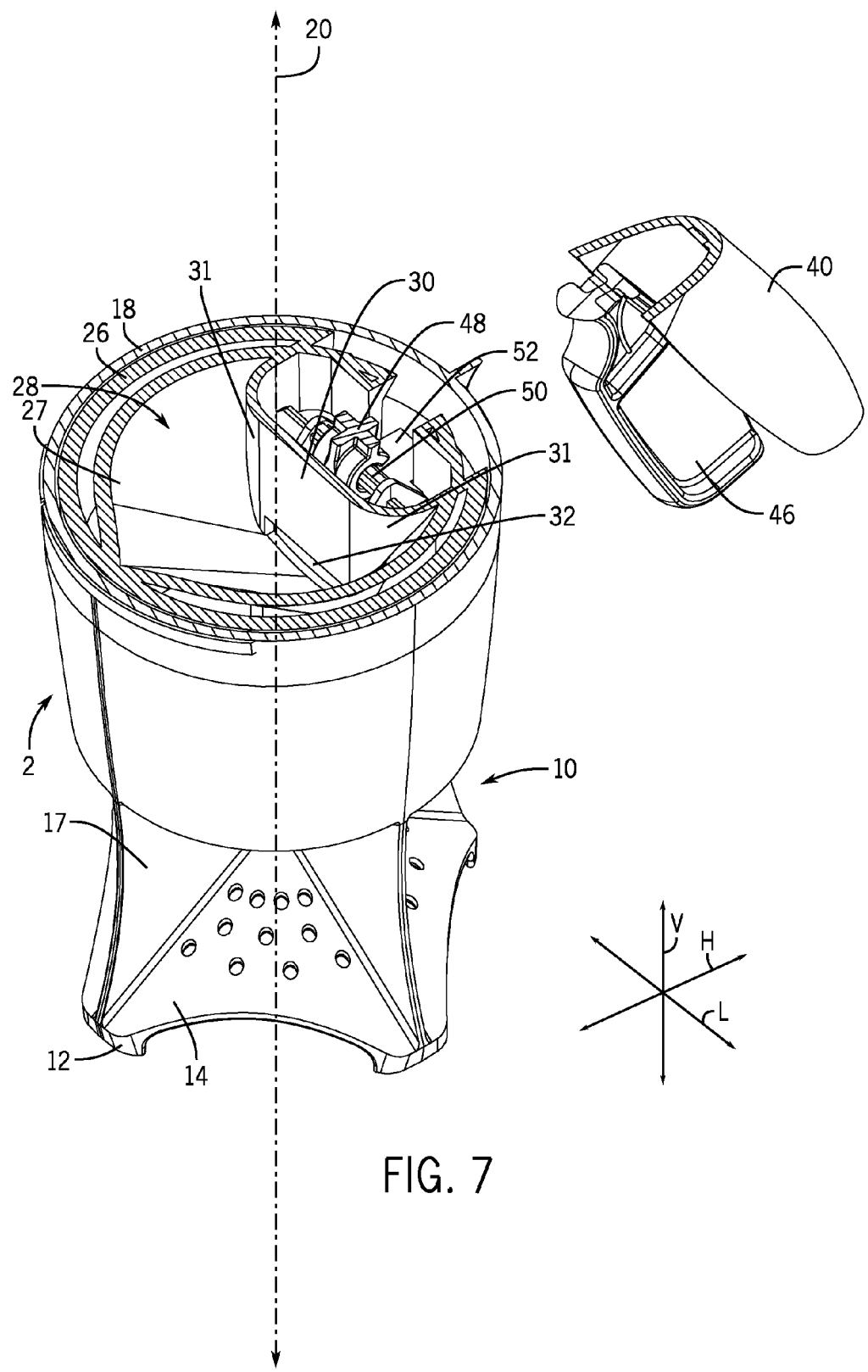
FIG. 7 is a sectional view taken along line 7-7 in FIG. 1.

FIG. 2 depicts an exploded view of an exemplary embodiment of the dispenser 2. As can be seen in FIG. 2, the hopper 25 includes at least one sidewall 26. In the exemplary embodiment, the sidewall 26 is generally cylindrical; however, it is understood that in alternative embodiments, the hopper 25 may take other shapes including polygonal shapes with a plurality of sidewalls. The top of the hopper 25 is open to receive granular material. However, it is contemplated that the top of the hopper 25 may be fitted with a lid 60 to prevent contaminants from entering the hopper 25. The at least one sidewall 26 of the hopper 25 defines a generally open interior divided into at least a collection portion 28 and a metering chamber 29. In an exemplary embodiment, the metering chamber 29 is defined by at least a portion of the at least one hopper sidewall 26 and an interior or metering chamber wall 30. In additional embodiments, the metering chamber 29 may be further defined by sidewalls 31 extending between the metering chamber wall 30 and the at least one sidewall 26. In still further embodiments, the metering chamber 29 may be apart from the hopper 25.

The collection portion 28 is exemplarily defined within the hopper 25 opposite the metering chamber 29 between the metering chamber wall 30 and the at least one sidewall 26. The collection portion 28 further includes a sloped surface 27 between the sidewall 26 and the metering chamber wall 30 at an end of the collection portion 28 opposite the top of the hopper 25. The collection portion 28 in the exemplary embodiment is cone shaped. However, other shapes may be utilized. Additionally, the sloped surface 27 is sloped to direct granular material by gravity to a through-hole 32 through the metering chamber wall 30, to be discussed in greater detail below.

Alternate embodiments may divide the collection portion 28 into multiple collection portions. Multiple collection portions may be defined by walls and other structures within the interior space of the hopper 25. The multiple collection portions may be used to hold and dispense different granular materials from the same dispenser. Some such embodiments may further divide the through-hole 32 into multiple portions or use a plurality of through-holes 32.

In some embodiments, handle 40 may be connected to hopper 25. In an exemplary embodiment, the handle 40 is manufactured as an integral part of the hopper 25. However, it is contemplated that the handle 40 could be connected to the hopper 25 by other means. The actuator assembly 15 includes the handle 40 and a trigger assembly 45 described herein.

Figure 8:
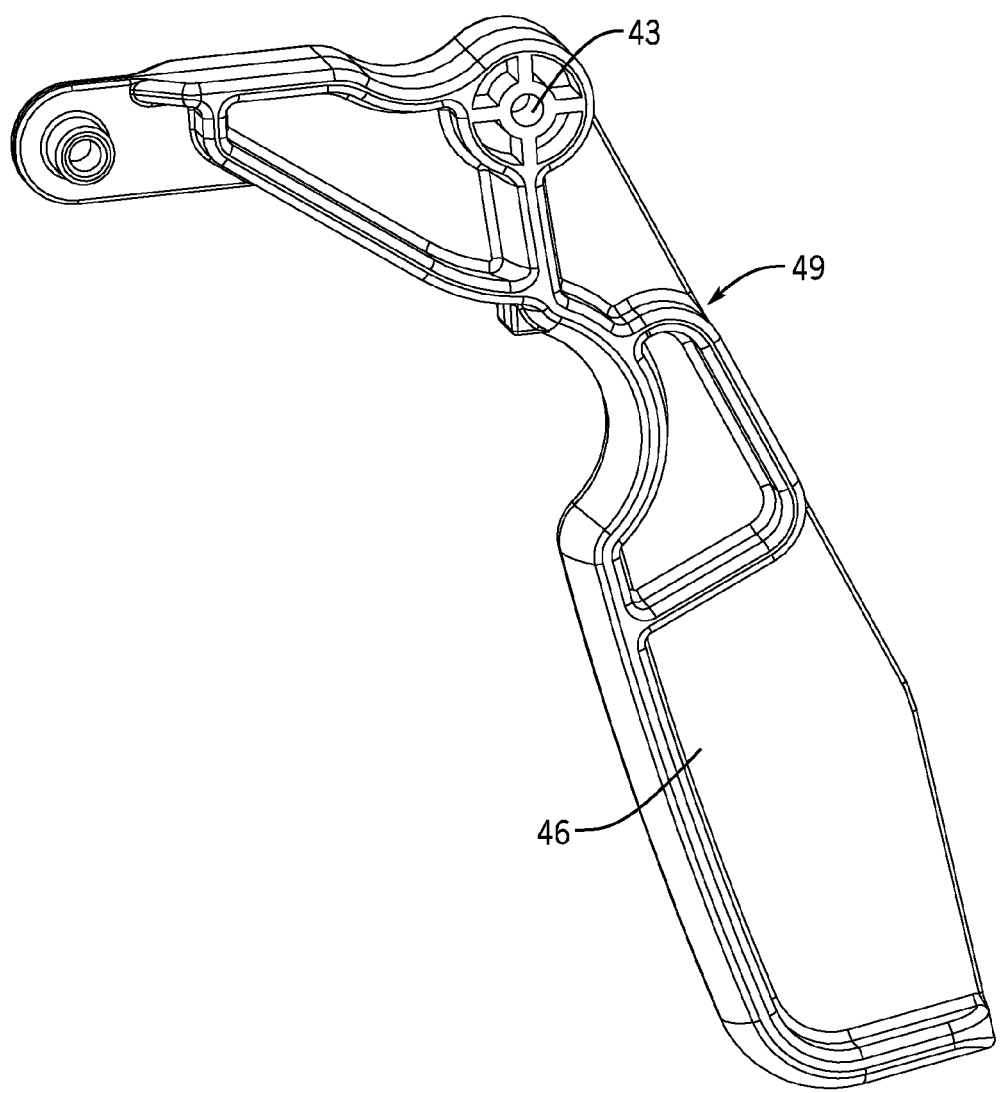
FIG. 8 is a detailed view of an exemplary embodiment of a trigger.

A trigger assembly 45 exemplarily includes a trigger 46 and a linkage 48. The trigger 46 is exemplarily pivotably connected to the handle 40 at a pivot 43 secured by a pivot pin 47. The linkage 48 is pivotally connected to a connecting member 50 of a metering cartridge 52. In an embodiment, the connecting member 50 is a rod about which the linkage 48 may pivot relative to the metering cartridge 52. The trigger 46 in the exemplary embodiment is "L"-shaped. However, the trigger 46 may take any other shape. FIG. 8 depicts an exemplary embodiment of the trigger 46. In an exemplary embodiment to be discussed further herein the trigger 46 includes a rear surface 49. The rear surface 49 is configured to be engaged by a spring 51. The spring 51 is exemplarily secured inside the handle 40 and applies a biasing force against the trigger 46. In one embodiment, the spring 51 may be a leaf spring, while in other embodiments a coil spring or other form of spring. It will be recognized that other embodiments may bias the trigger 46 in other ways besides a spring. The biasing force biases the trigger assembly 45, and the metering cartridge 52 connected to the trigger assembly 45, into a first or fill position as to be described in further detail herein.

Figure 9:
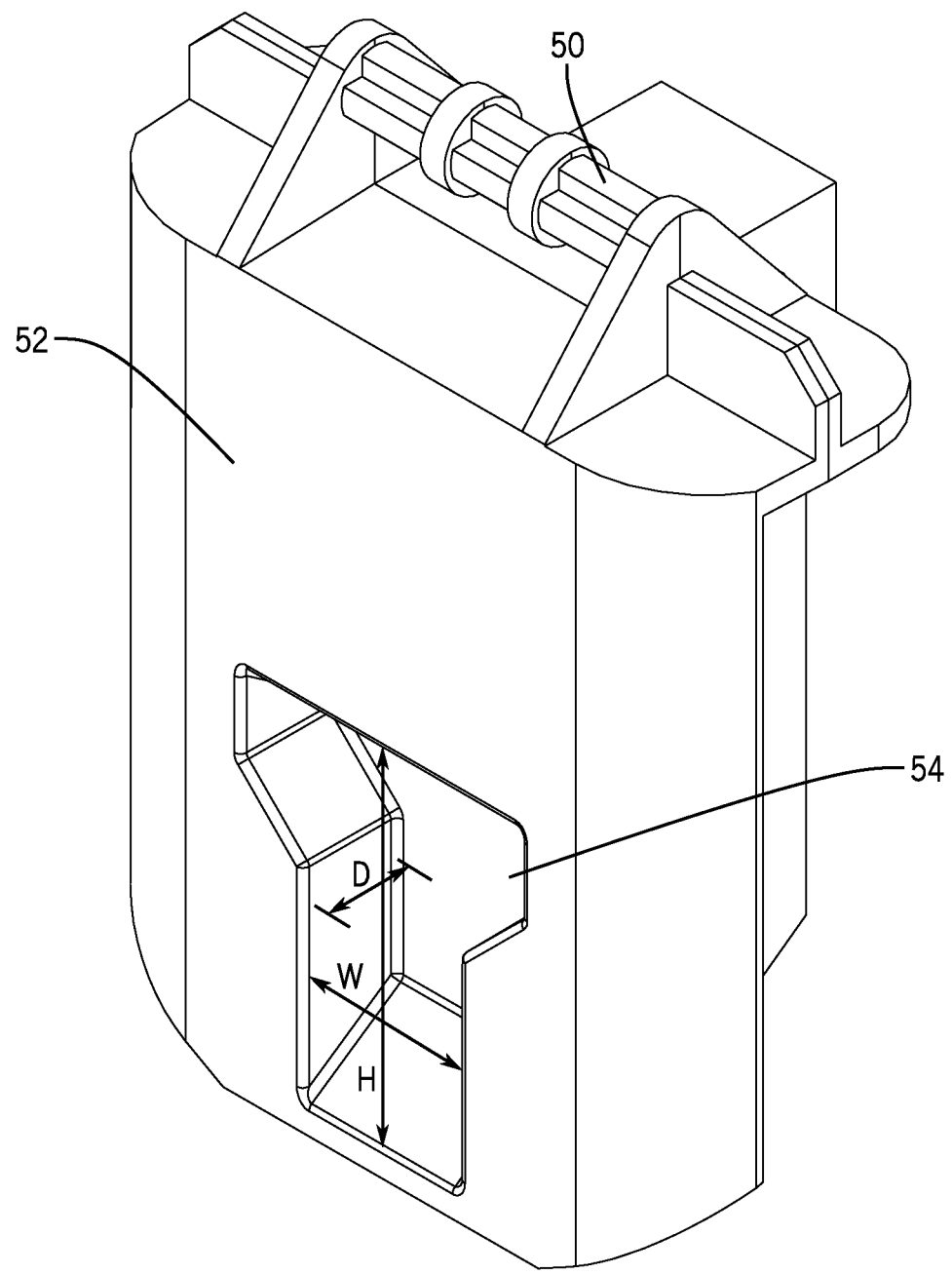
FIG. 9 is a detailed view of an exemplary embodiment of a metering cartridge.

FIG. 9 depicts an exemplary embodiment of the metering cartridge 52. Exemplarily, the connecting member 50 is formed as part of the metering cartridge 52. In other embodiments, the connecting member 50 is a surface of the metering cartridge 52 which is engaged by the linkage 48. In still other embodiments, the metering cartridge 52 may be selectively connectable to the connecting member 50 and disconnectable for maintenance, inspection, repair, or connection of alternate metering cartridges to the trigger assembly 45. Alternately, the linkage 48 may be separate and disconnectable from the trigger 46 so that an alternate linkage and metering cartridge can be used in the trigger assembly 45.

In the embodiment depicted in FIG. 9, the metering cartridge 52 includes one portion recess 54. Exemplarily, the portion recess 54 has a height H, a depth D, and a width W. It is also to be understood that the portion recess 54 may include multiple portions having different respective heights, widths, and depths, as exemplarily depicted in FIG. 9. The overall volume of the portion recess 54 is defined by these dimensions and the volume of the portion recess 54 is exemplarily a predetermined volume. The volume may be another unit of dry measure, (e.g. one ounce), or may be a volume associated with a weight of a substance having a particular density (e.g. one gram of salt), or any fraction or multiple thereof. A person of ordinary skill in the art will also recognize other volumes as may be used in different embodiments based upon this disclosure.

Figure 10:
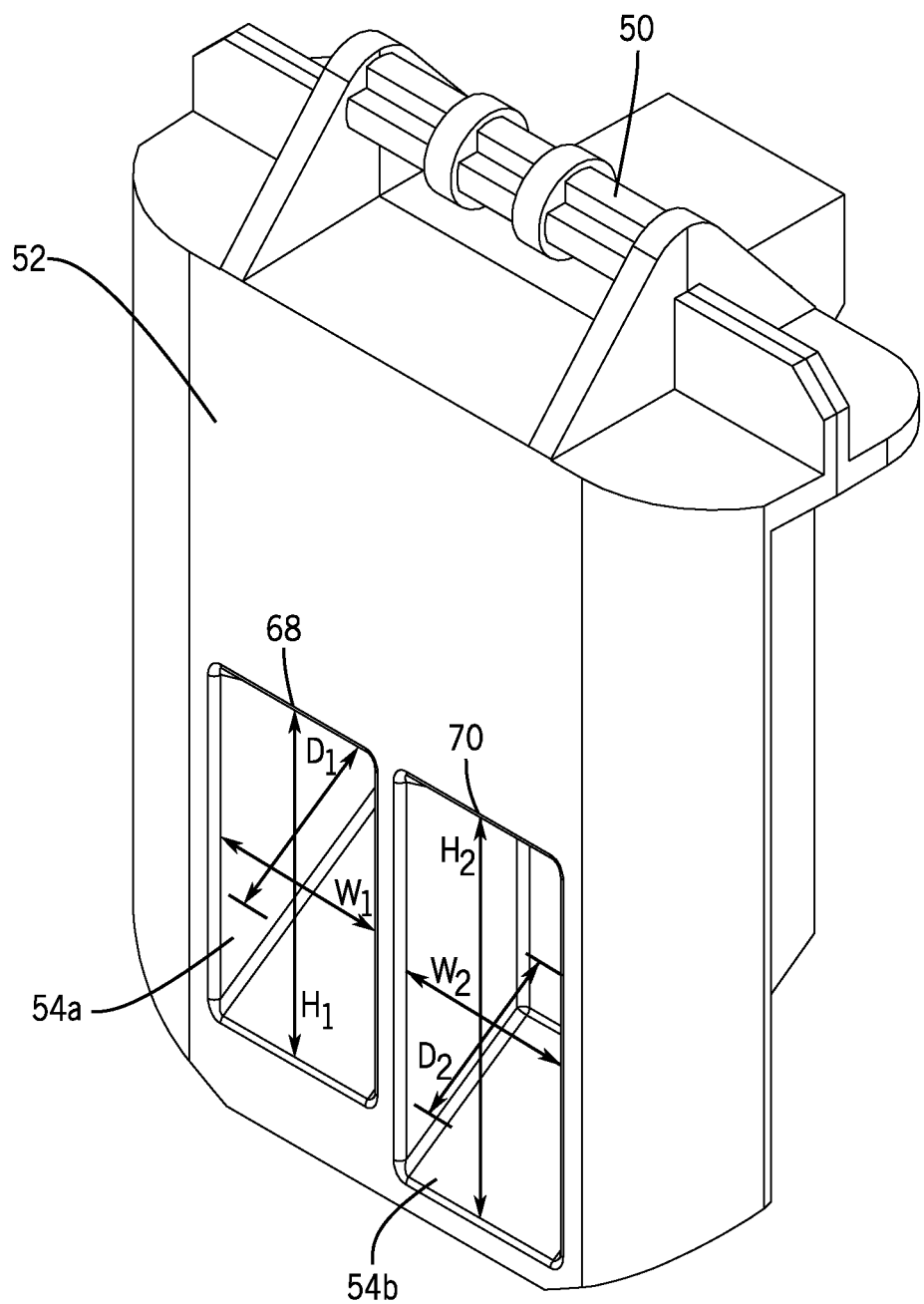
FIG. 10 is a detailed view of another exemplary embodiment of a metering cartridge.

FIG. 10 depicts an additional exemplary embodiment of a metering cartridge 52. The metering cartridge 52 includes a first portion recess 54a and a second portion recess 54b. As exemplarily described above with respect to FIG. 9, the first portion recess 54a is exemplarily defined by at least one height H1, at least one width W1, and at least one depth D1. Similarly, the second portion recess 54b is exemplarily defined by at least one height 112, at least one width W2, and at least one depth D2. These respectively define the respective volumes of the first portion recess 54a and the second portion recess 54b. It is to be noted that the first portion recess 54a and the second portion recess 54b are exemplarily arranged within the metering cartridge 52 in an adjacent or side-by-side orientation. It is to be understood that in alternative embodiments, other arrangements or portion recesses are contemplated.

As exemplarily depicted in FIG. 10, the second portion recess 54b has a height dimension H2 which is exemplarily longer than a height dimension H1 of the first portion recess 54a. It is contemplated that the first portion recess 54a and the second portion recess 54b may have different dimensions, define different volumes, or both. In an exemplary embodiment, despite the height dimension H2 of the second portion recess 54b being longer than the height H1 dimension of the first portion recess 54a, the depth dimension D1 of the first portion recess 54a is greater than the depth dimension D2 of the second portion recess 54b such that the first portion recess 54a and the second portion recess 54b define the same volumes, which may be any of the volumes as described above.

In operation, the metering cartridge 52 is translatably located in the metering chamber 29. The connecting member 50 and linkage 48 are located near the top of the hopper 25. The trigger 46 is located adjacent the handle 40. The trigger 46 is connected to the handle 40 by a pin 47. Alternatively, the trigger 46 could be connected to the hopper 25.

In the exemplary embodiment, the metering cartridge 52 moves in a vertical direction V. The metering cartridge 52 moves as force is applied to the trigger 46 against the biasing force, exemplarily provided by spring 51. When a force is applied to the trigger 46, the trigger 46 rotates about the pin 47 and the linkage 48 pivots about the end of the trigger 46. The linkage 48 also rotates around the connecting member 50 and forces the connecting member 50 downward. The movement of these components cause the metering cartridge 52 to translate within the metering chamber 29. It will be recognized that a variety of other actuators including mechanical, electrical, or motor driven actuators may also be used in embodiments to translate the metering cartridge 52 within the metering chamber 29, including, but not limited to servo motors, worm gears, or the like. The following example given herein will exemplarily refer to the metering cartridge 52 depicted in FIG. 10, although it will be recognized that other metering cartridges may be used. The metering cartridge 52 is guided in the vertical direction V by the metering chamber 29. Once the force is removed from the trigger 46, the trigger assembly 45 returns to a rest position by spring mechanism, mechanical action, electric action, gravity, or other returning actuation.

To further describe the movement of the metering cartridge 52 in the exemplary embodiments, several positions are described below and reference FIGS. 11-13. However, it should be understood that positions may be added or removed based other embodiments of the dispenser 2.

Figure 11:
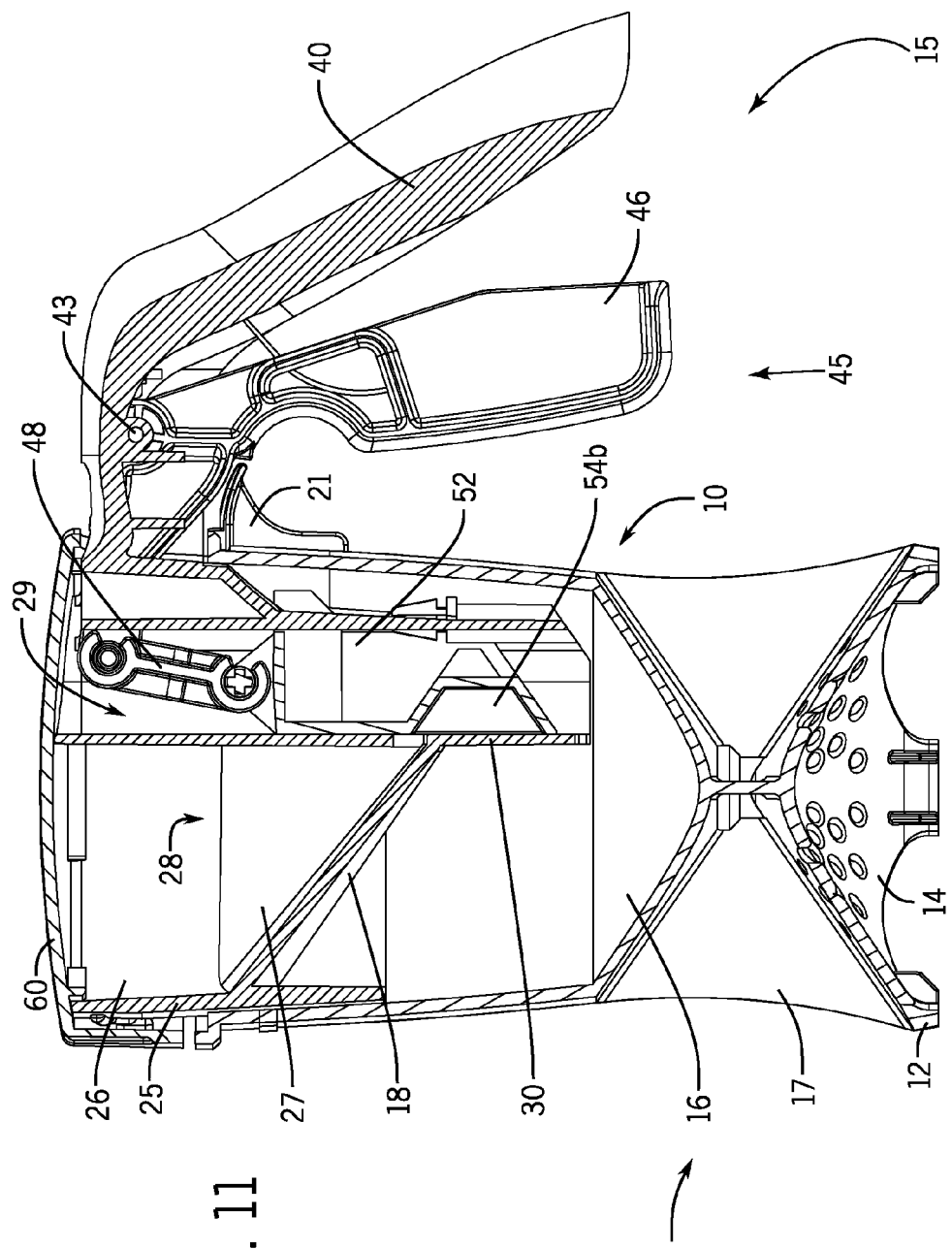
FIG. 11 is a perspective view of the dispenser in a first position.

In a first position, as shown by FIG. 11, the trigger assembly 45 is exemplarily in a first, rest position. In the first position, the metering cartridge 52 is located in the metering chamber 29.

The portion recesses 54a, 54b are at least partially aligned with the through-hole 32 in the metering chamber wall 30. The at least partial alignment of the portion recesses 54a, 54b with the through-hole 32 facilitates the filling of both of the portion recesses 54a, 54b by a gravity feed with granular material from the collection portion 28. As previously described in exemplary embodiments, both the first portion recess 54a and the second portion recess 54b define the same volumes. General alignment of respective top ends 68, 70 of the first portion recess 54a and the second portion recess 54h facilitate the simultaneous at least partial alignment of the first portion recess 54a and the second portion recess 54b with the through-hole 32. As also previously mentioned, in alternative embodiments, the collection portion 28 may include a dividing wall (not depicted) to divide the collection portion in two. The divided collection portion can be operated to hold two different granular materials (e.g. salt and pepper) such that the first portion recess 54a and the second portion recess 54b may be simultaneously respectively filled with different granular materials. In exemplary embodiments, the sloped surface 27 of the collection portion 28 further facilitates the gravity feed and filling of the first portion recess 54a and second portion recess 54b with the granular material or materials.

Figure 12:
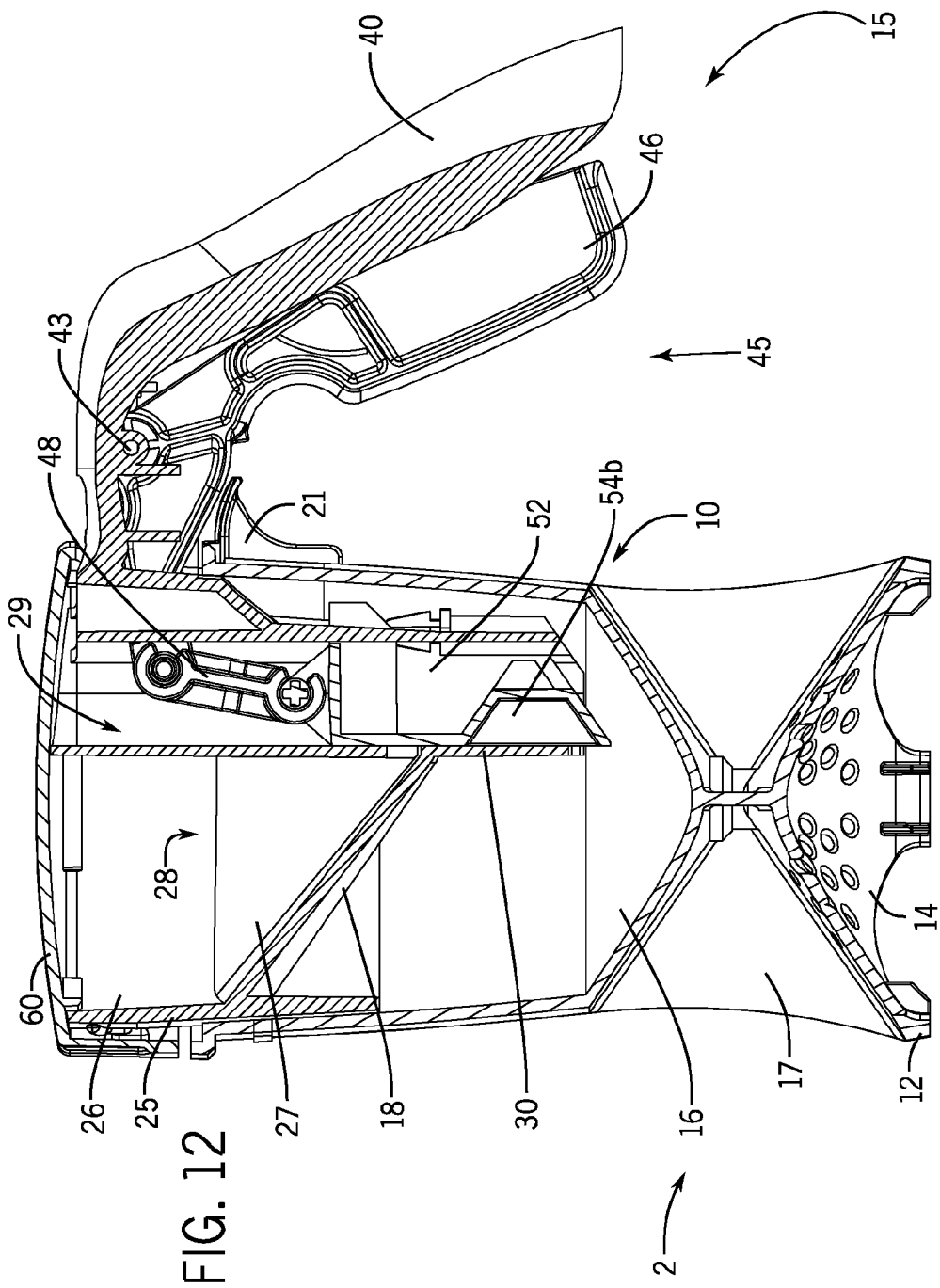
FIG. 12 is a perspective view of the dispenser in a second position.
Figure 13:
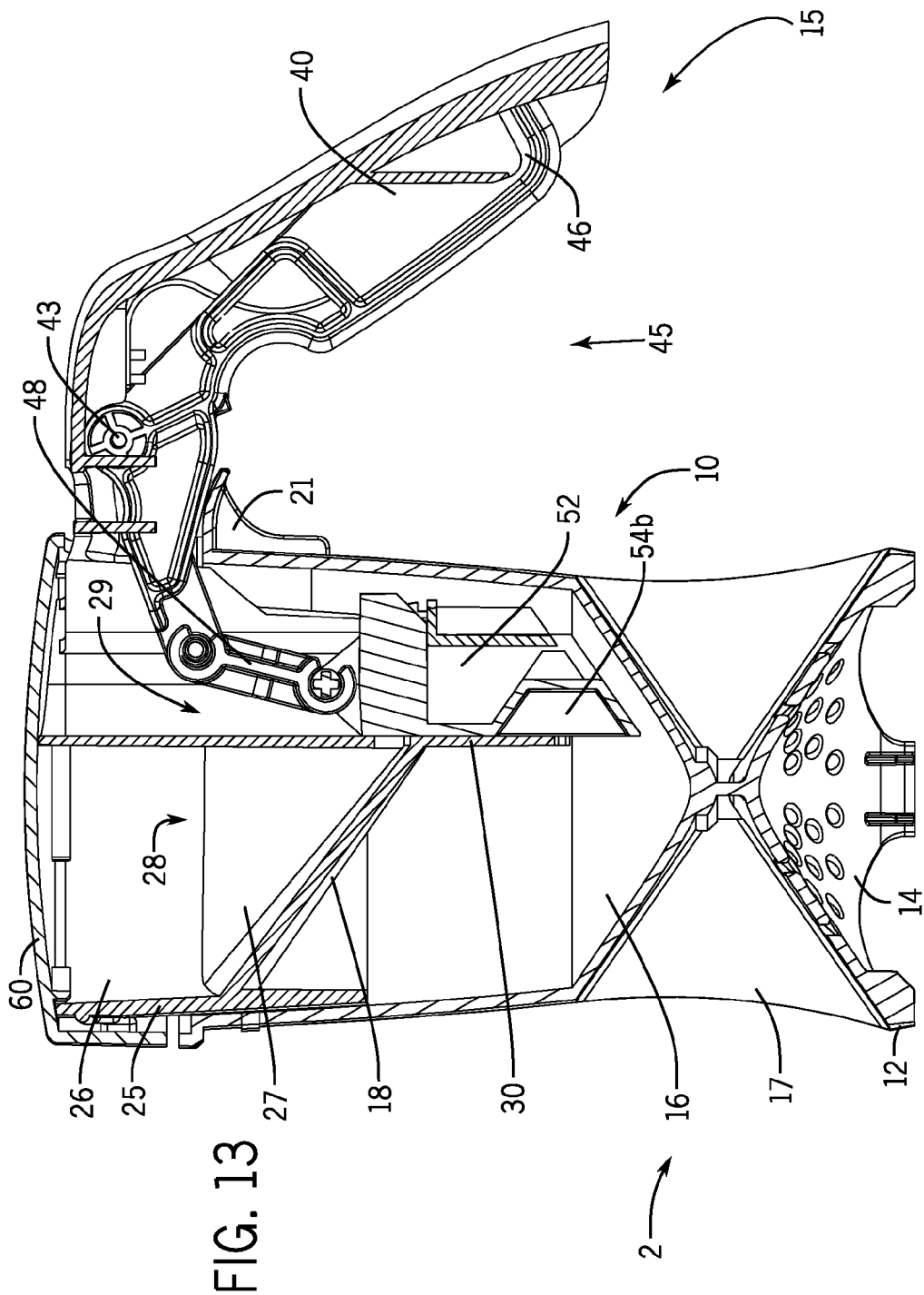
FIG. 13 is a perspective view of the dispenser in a third position.

In an exemplary operation, a force applied to the trigger 46 causes the trigger assembly 45 to translate the metering cartridge 52 within the metering chamber 29 to an exemplary second position depicted in FIG. 12 in the exemplary second position, part of the metering cartridge 52 has translated through the metering chamber 29 to extend out of a bottom 33 of the hopper 25. In the second position, at least a portion of the second portion recess 54b is exposed out of the bottom 33 of the hopper 25 and the portion of granular material held within the second portion recess 54b is dispensed by a gravity feed into the distribution portion 14. The dispense of the granular material from the second portion recess 54b is exemplarily achieved in this embodiment while dispense of the granular material in the first portion recess is blocked, exemplarily by the metering chamber 29.

In an exemplary third position of the metering cartridge 52, the metering cartridge 52 is further translated within the metering chamber 29 such that a greater portion of the metering cartridge 52 extends out of the bottom 33 of the metering chamber 29 and hopper 25. In this third position, exemplarily depicted in FIG. 13, both the first portion recess 54a and the second portion recess 54b are at least partially exposed from the hopper 25 and the granular material held within the first portion recess 54a and the second portion recess 54b is dispensed by a gravity feed into the distribution portion. It will be recognized, exemplarily dependent upon the amount of time that the metering cartridge 52 was in the second position before being translated into the third position, that some or all of the granular material may have already been dispensed from the second portion recess 54b by the time that the metering cartridge 52 is positioned in the third position and the granular material is dispensed from the first portion recess 54a. While in still other embodiments, for example, if the metering cartridge 52 is moved directly from the first position to the third position, there may be simultaneous dispense of granular material from both the first portion recess 54a and the second portion recess 54b.

In an exemplary embodiment, it will be recognized that the dispenser 2 is generally defined along a central axis 20. In an exemplary embodiment, it will be recognized that when the metering cartridge 52 is in the first position, the first portion recess 54a and second portion recess 54b are exemplarily filled by gravitational feed in a direction radially away from the central axis 20, while during dispense of the granular material respectively from the first portion recess 54a and the second portion recess 54b exemplarily in the second and third positions of the metering cartridge 52, that the gravitational dispense of the granular material is in a direction radially towards the central axis 20 exemplarily into the funnel portion 16.

The positions may be located on a continuum of movement based on the amount of force applied to the trigger 46. Alternately, the positions may be reached in steps or by additional actuations added to the trigger 46. For example, one complete pull of the trigger 46 moves the assembly to the second position and a second complete pull of the trigger 46 moves the assembly to a third position, etc.

A lid 60 is attached to the top of the dispenser 2. In the exemplary embodiment, the lid 60 is pivotally connected to the handle 40 by a lid pin 61. In a closed position, the lid 60 covers the top of the hopper 25 to prevent contaminants, moisture, and other foreign objects from entering the hopper 25. The lid 60 may be pivoted to an open position so that granular material can be added to the collection portion 28 or maintenance can be done to the dispenser 2. In other embodiments, the lid 60 may be connected to other components of the dispenser 2 such as the hopper 25. In some embodiments, the lid 60 may be bi-hinged or the lid 60 may be fitted with screw threads to engage with screw threads on the upper portion 18.

In the exemplary embodiment, the hopper 25 is connected to the dispersion base 10 by a hopper pin 34 engaged with a pin receiver 19. The hopper pin 34 is connected to the hopper 25 and the pin receiver 19 is connected to the dispersion base 10. The hopper pin 34 is received in the pin receiver 19, and a rotational force is applied to the hopper 25 to move the hopper pins 34 into a locking position of the pin receiver 19.

In the exemplary embodiment, a support ledge 21 is connected to the dispersion base 10. The support ledge 21 extends from the dispersion base 10 in the horizontal direction H. The support ledge 21 provides a contact and support location for trigger 46 when the trigger 46 moves. The support ledge 21 prevents the trigger 46 from moving past a movement limit.

It is contemplated that a trigger stop can be included with the dispenser 2. The trigger stop prevents the trigger assembly 45 from moving past a certain portion or stops the trigger assembly 45 from moving at all. The trigger stop may be connected at the trigger assembly 45 at any point along the trigger assembly 45.

Referring now to FIGS. 14-18, an additional embodiment of a dispenser 100 is depicted. Like reference numerals are used herein with respect to the dispenser 100 and FIGS. 14-18 as are found above with respect to FIGS. 1-13 to reference similar structures.

Figure 14:
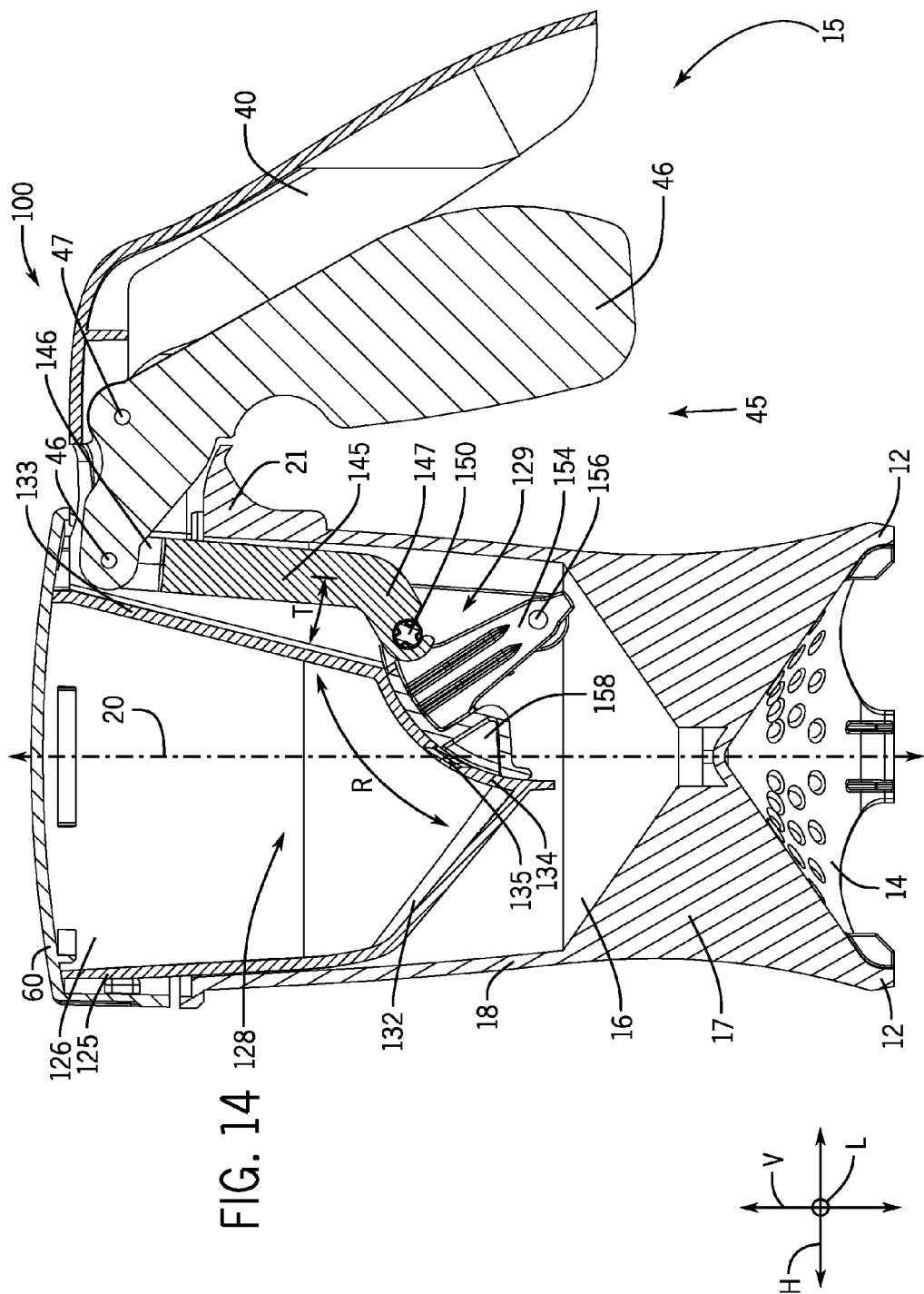
FIG. 14 is a sectional view taken along the center line of an alternative embodiment of the dispenser.
Figure 15:
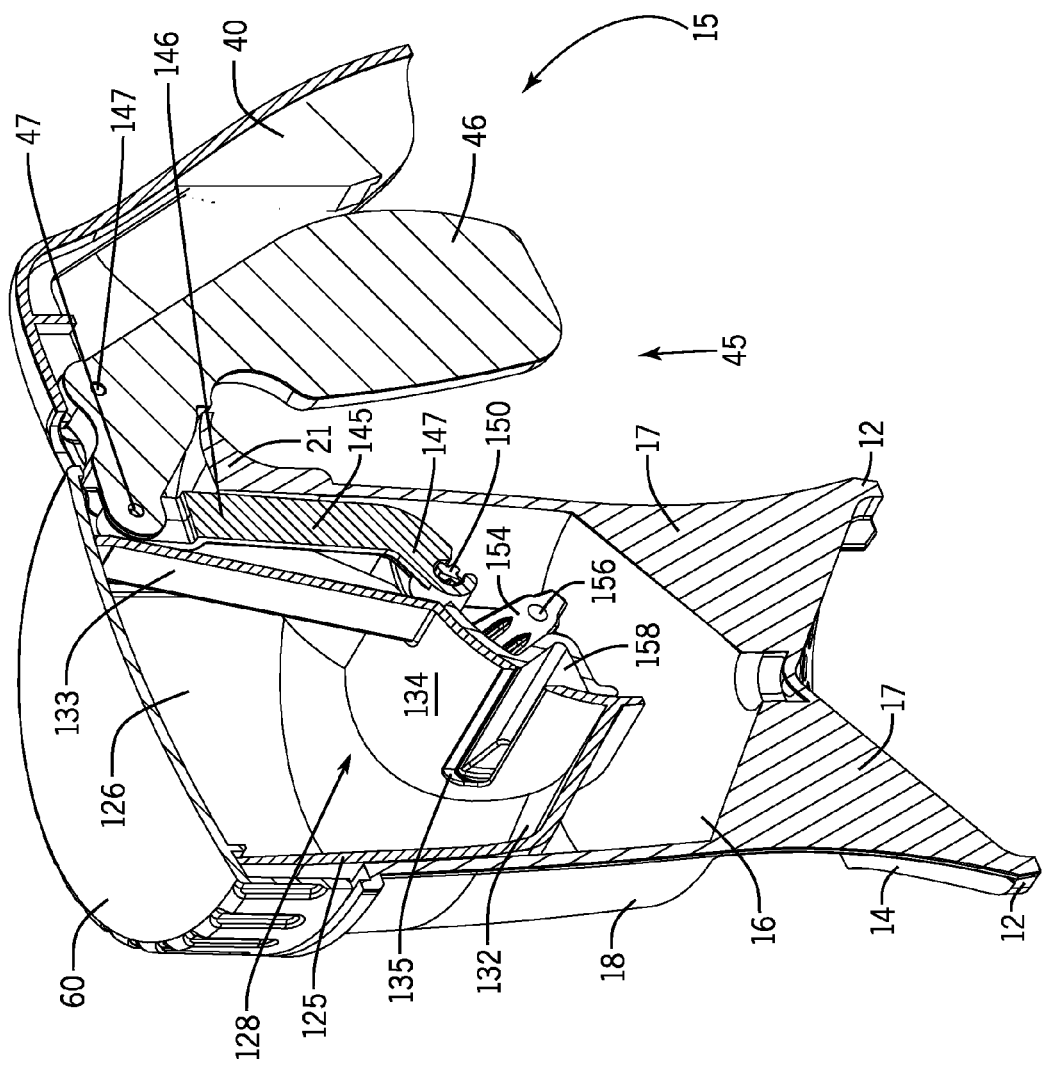
FIG. 15 is a front perspective sectional view taken along the center line of FIG. 14.

FIG. 14 is a side sectional view of the dispenser 100. FIG. 15 is a perspective sectional view of the dispenser 100. The dispenser 100 exemplarily includes a dispersion base 10, a hopper 125, a trigger assembly 45, and a lid 60. The dispersion base 10 includes a base portion 12, a distribution portion 14, a funnel portion 16, and an upper portion 18, exemplarily as described above.

The hopper 125 includes a collection portion 128 defined by a plurality of sidewalls including first sidewall 126, second sidewall 132, and third sidewall 133. An interior or metering chamber wall 134 is located toward the lower portion of the hopper 125. The sidewalls 126, 132, 133, and wall 134 form a generally cone shaped interior and are orientated, to direct granular material to a through-hole 135 in the wall 134, as will be described in further detail herein. Sidewall 126 and sidewall 133 divide the generally open interior of the hopper 125 into the collection portion 128 and a metering chamber 129. A metering cartridge 152, which will be further described herein, is located in the metering chamber 129. The third sidewall 133 defines a linkage recess 149 which will also be further described herein.

Figure 17:
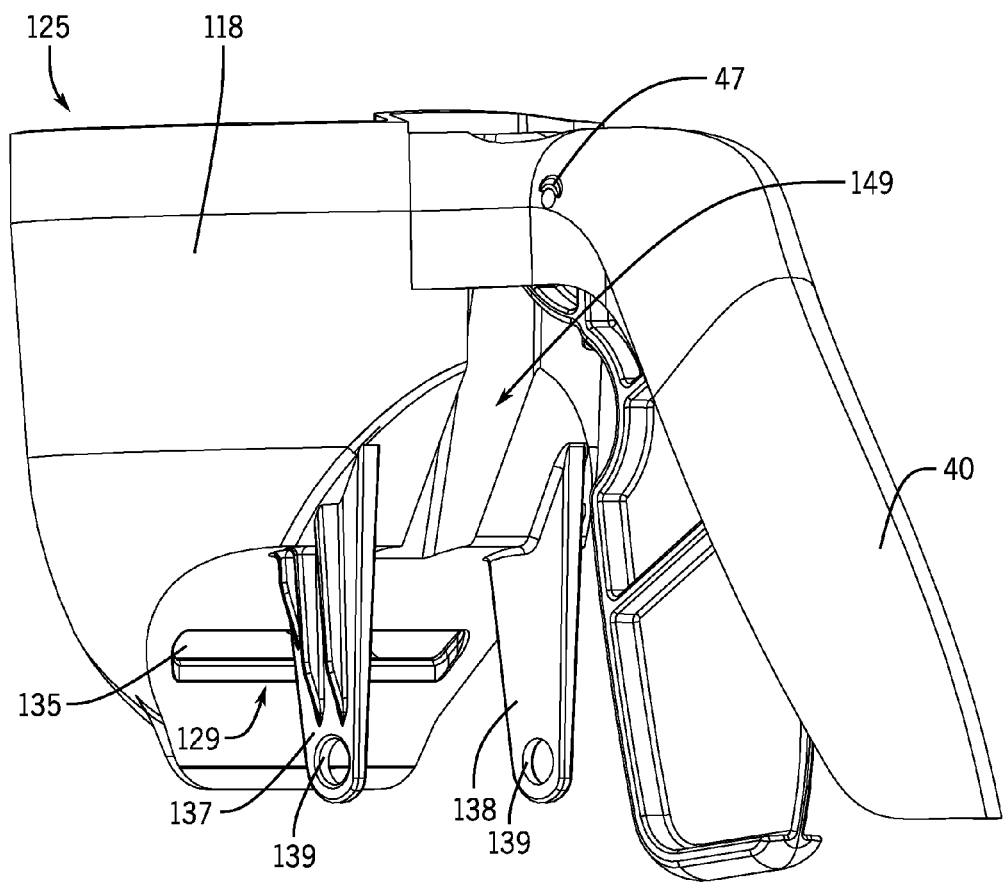
FIG. 17 is a detailed view of an alternative embodiment of a hopper.

FIG. 17 depicts the exterior rear view of the hopper 125. The upper portion 118 of the hopper 125 is adjacent to the metering chamber 129 and the linkage recess 149. The metering chamber 129 and linkage recess 149 are shaped to allow the metering cartridge 152 and linkage 145 to be located in the metering chamber 129 and the linkage recess 149, respectively. The hopper 125 also includes a first anchor member 137 and a second anchor member 138. The first anchor member 137 and second anchor member 138 are connected to the exterior surface of the hopper 125 and protrude downwardly away from the exterior surface of the hopper 125. The first anchor member 137 and second anchor member 138 also include a connecting hole 139.

Figure 16:
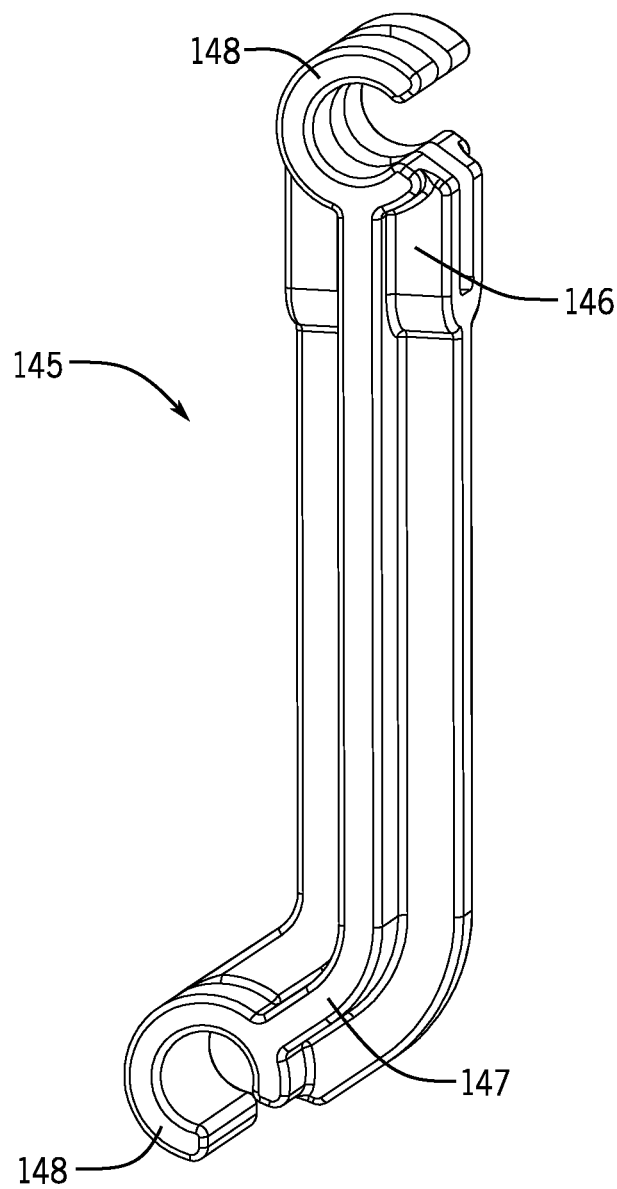
FIG. 16 is a detailed view of an alternative embodiment of a linkage.

FIG. 16 depicts the linkage 145 in greater detail. Linkage 145 is generally "J"-shaped with a first end 146 and a second end 147. The linkage 145 terminates with connectors 148 respectively located at each of the first end 146 and the second end 147. In an exemplary embodiment, the connectors 148 are resilient hooks, as depicted, configured to resiliently deform to receive a structure such as a pivot pin therein. The first end 146 connects to the pivot pin 47, and the second end 147 connects to a connecting member 150 further described herein.

Figure 18:
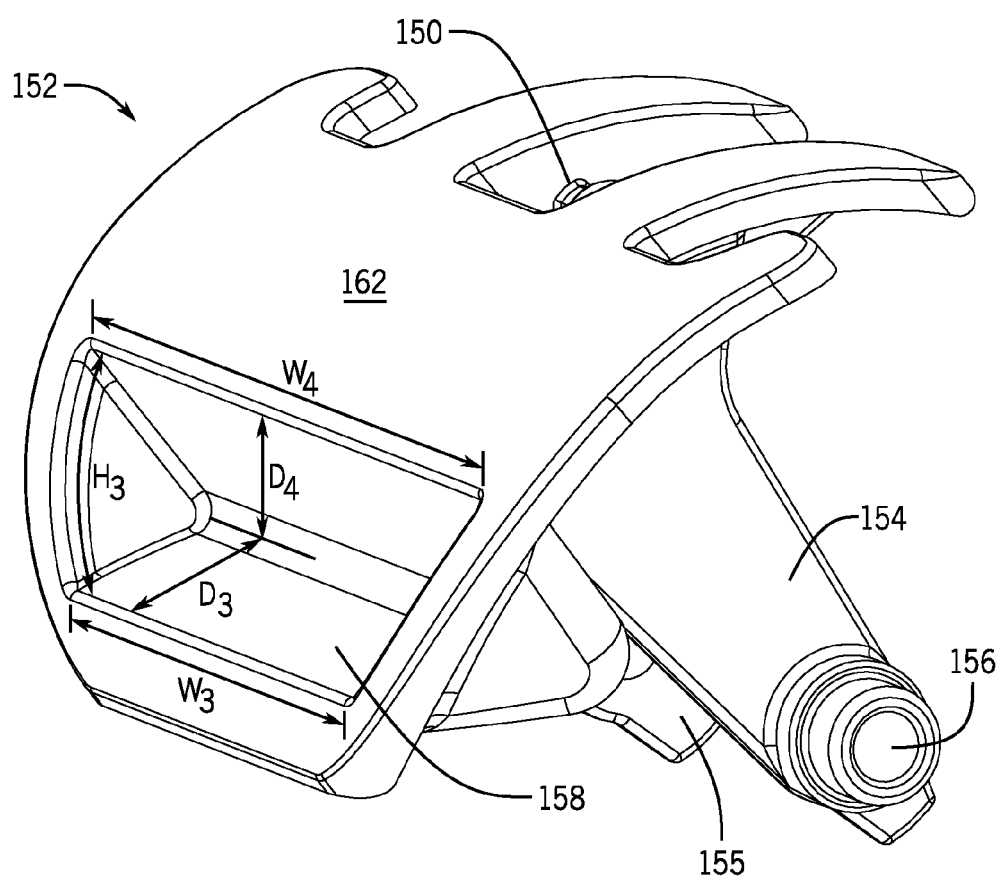
FIG. 18 is a detailed view of an alternative embodiment of a metering cartridge.

FIG. 18 depicts an alternative embodiment of the metering, cartridge 152. In this embodiment, the metering cartridge 152 includes one portion recess 158. It will be recognized that other embodiments of the metering cartridge 152 may include more than one portion recess 158, as described with respect to other embodiments above. The portion recess 158 is wedged-shaped having a radial height H3, a first depth D3, a second depth D4, a first width W3, and a second width W4. The overall volume of the portion recess 158 is defined by these dimensions and the volume of the portion recess 158 is a predetermined value.

The metering cartridge 152 is shaped to fit into the metering chamber 129. The metering cartridge 152 includes a metering cartridge surface 162. The metering cartridge surface 162 is curved and has the same curvature as the metering chamber wall 134. The metering cartridge 152 is positioned to be flush with metering chamber wall 134. The metering cartridge 152 also includes a connecting member 150, a first radial member 154, a second radial member 155, and a plurality of pivot elements 156. First radial member 154 and second radial member 155 protrude radially inward opposite from the metering cartridge surface 162. The pivot elements 156 are located on the outwardly extending surfaces of the first radial member 154 and the second radial member 155. In an exemplary embodiment, the pivot elements 156 are located at a central axis commensurate with a curvature of the metering cartridge surface 162. The metering cartridge 152 is connected to the hopper 125 by inserting the pivot elements 156 into the holes 139 of the first anchor member 137 and second anchor member 138. The connecting member 150 is connected to the linkage 145 by the second end 147. The connecting member 150 is exemplarily one or more rods to which the linkage 145 is pivotably connected.

In operation, the metering cartridge 152 pivotally rotates about the pivot elements 156 within the holes 139 such that the portion recess 158 is exposed to the through-hole 135 of the hopper or obstructed by the metering chamber wall 134. The pivot elements 156 and holes 139 are located eccentrically from the central axis 20. However, one having ordinary skill in the art may position the pivot elements 156 and/or the holes 139 at any location in the dispenser 100 including on the central axis 20.

The metering cartridge 152 pivots as forces are applied to the trigger 46 against a biasing force, exemplarily provided by a spring 51, as described above. The trigger 46 rotates about the pin 47 and the linkage 145 pivots. The linkage 145 moves vertically V and/or translates along path T. The vertical motion V of the linkage 145 causes the second end 147 to enter into the metering chamber 129 while the upper end 146 generally translates along path T toward the interior of the linkage recess 149. The force is transferred from the linkage 145 to the metering cartridge 152 by the connecting member 150 causes the metering cartridge to radially rotate about the pivot element 156 and holes 139 in radial direction R.

In a fill position, the metering cartridge 152 is exposes the portion recess 158 to the through-hole 135 of the hopper 125. In this position, material in the collection portion 128 passes through the through-hole 135 into the portion recess 158. In another position, the metering cartridge 152 radially rotates along direction R such that the portion recess 158 is not exposed to the through-hole 135. Instead, the through-hole 135 is occluded by the metering cartridge surface 162 to prevent further movement of the granular material in the collection portion 128 through the through-hole 135. Further rotation of the metering cartridge 152 along direction R causes the portion recess 158 to rotate past the metering chamber wall 134 causing the material contained within the portion recess 158 to fall by gravity into the funnel portion 16 of the dispenser 100. When forces acting on the trigger 46 are released, the metering cartridge 152 rotates along direction R hack to the fill position. It will be understood that an embodiment of the metering cartridge including two or more portion recesses may operate in a manner similar to that as described above to provide for selective dispense front a first portion recess, than a second portion recess.

In an exemplary embodiment, portion recess 158 is filled by gravitational feed in a direction radially away from the central axis 20, and while during the dispense of the granular material from the portion recess 158, the gravitational dispense of the granular material is in a direction radially towards the central axis 20 into the funnel portion 16.

Material inserts may be added to the dispenser. The material inserts are made of a material different than the surrounding structure. Material inserts may include metal or other plastics which have different material properties from other components of the dispense that achieve advantageous results. For instance, a material insert may be used at the base of the through-hole to prevent damage due to grinding of granular material between the through-hole and portion recess during movement.

In still further embodiments, dimensional, material, or structural components (e.g. gaskets or tight dimensional fits) may be used in the metering cartridge and the metering chamber such that the granular material is respectively held in the collection portion, first portion recess, and/or second portion recess except for the filling and dispensing operations as described.

In other embodiments of the invention, multiple actuators and/or actuator assemblies may be used in conjunction with multiple metering cartridges. The actuator assemblies may include the trigger assemblies described above or may include other actuators, including, but not limited to servo motors, screws, worm gears, other drives and linkages. The actuators and/or actuator assemblies may be included, adjacent to one another. The actuators and/or actuator assemblies could also be included at different locations on the dispenser. Each actuator and/or actuator assemblies may move a different metering cartridge or each actuator may move a metering cartridge to a different position. It is also contemplated that an actuator may move multiple metering cartridges.

Furthermore, the invention may include multiple metering cartridges in the same metering chamber or in adjacent metering chambers opening to one or more collection portions. Multiple metering cartridges allow the dispenser to dispense different quantities of granular material and allow the dispenser to be customizable. In still further embodiments, multiple metering cartridges may dispense into multiple distribution portions.

Although these examples are merely exemplary, a person of ordinary skill will recognize that the concepts of this invention are applicable to other types of dispensers. For instance, the concepts of this invention may be applied to wall mounted dispenser or tabletop unit. In the instance of the wall mounted dispenser, the dispenser may include a hopper, metering cartridge, and metering chamber. The wall mounted dispenser may disperse the granular material through a distribution portion as described above or in another distribution pattern. The metering chamber may be located adjacent a sidewall of the hopper, and the collection portion may be located adjacent to the metering chamber. The metering cartridge may translate as described above, but any of the actuators and/or actuator assemblies as described above may also be used. The movement of the actuator may be facilitated by wide range of forces including human forces (pushing, pulling, etc.), mechanical actions (gravity, linkages, etc.), and electronic actions facilitated by electronic computers and wiring systems. Multiple trigger assemblies, metering chambers, and collection portions may be included.

It is further contemplated that the concepts of this invention may be used in free standing tabletop or ground mounted dispensers. For example, the concepts of this invention may be utilized in drink making machines using granular materials. The hopper and actuator assembly may be included within the dispenser. When a user selects a drink, via an external button or lever, various trigger assemblies may be actuated by an electronic circuit board to create the corresponding drink mix. The trigger assemblies cause the metering cartridges to more in a vertical direction as described herein. Based on the electrical signal generated by the circuit board the metering cartridge is moved to expose the prescribed portion recess or recesses.

In another embodiment, the invention described herein may be simplified. For instance, dispenser may provide a ring pull down to move the metering chamber and no trigger assembly is required. In this example, the hopper is accessible from the exterior of the dispenser and the metering chamber may be exposed to the exterior of the dispenser. The metering chamber may still be located adjacent to the collection portion of the hopper. A simple spring and pull may be used to move the metering cartridge. One end of the spring is connected to a lid covering the metering chamber. The other end of the spring is connected to the top of the metering chamber. A pull, such as a ring, is located at the bottom of the metering chamber. When a downward vertical force is applied to the pull, the metering chamber moves in a downward vertical direction by stretching the spring. Based on the amount of force used, the portion recess or recesses are exposed and dispense granular material to the dispersion base or directly to the product.

In the present Description, certain terms have been used for brevity, clearness, and understanding. No unnecessary limitation are to be implied therefrom beyond the requirement of the prior art because such terms are used for descriptive purposes only and are intended to be broadly consulted. The different dispenser apparatuses, systems, and methods described herein may be used alone or in combination with other apparatuses, systems, and methods. Various equivalents, alternatives, and modifications are possible within the scope of the appended claims.

The invention claimed is:

1. A dispenser comprising:
a hopper having a central axis, a collection portion at least partially defined by an interior wall interior to the hopper, the collection portion extending through the central axis, and a metering chamber at least partially defined by the interior wall and adjacent to the collection portion and extending through the hopper in a dimension parallel to the central axis, the collection portion having a sloped surface leading to a through-hole extending through the interior wall into the metering chamber; and
a metering cartridge comprising at least a first portion recess oriented in a direction of the collection portion, wherein the metering cartridge rotates within the metering chamber about at least one pivot point orthogonal to the central axis.

2. The dispenser of claim 1, further comprising an actuator assembly having an actuator handle, a trigger pivotably secured to the actuator handle, and a linkage pivotably secured between the trigger and the metering cartridge, wherein actuation of the trigger towards the actuator handle causes the metering cartridge to move within the metering chamber.

3. The dispenser of claim 1 wherein the metering cartridge is a first metering cartridge selected from a plurality of metering cartridges each having a different configuration of at least one portion recess.

4. The dispenser in claim 1 further comprising:
a dispensing base having a base portion, funnel portion, distribution portion, and upper portion, the upper portion defining an interior space, the funnel portion connected to the upper portion, the distribution portion connected to collection portion, and the base portion connected to the distribution portion.

5. The dispenser of claim 1 wherein the hopper is further defined by at least one vertically extending sidewall and the metering chamber is at least partially defined by the at least one vertically extending sidewall and a metering chamber wall interior to the hopper, the metering chamber wall further defining the collection portion and comprising the through-hole.

6. The dispenser of claim 1 wherein the pivot point is eccentric to the central axis.

7. The dispenser of claim 1 wherein the collection portion and the metering chamber are at least partially co-extensive in the vertical direction within the hopper and separated by a wall which extends at least partially vertically, the wall internal to the hopper and comprising the through-hole.

8. A dispenser comprising:
a hopper having a central axis, a collection portion at least partially defined by an interior wall interior to the hopper, the collection portion extending through the central axis, and a metering chamber at least partially defined by the interior wall and adjacent to the collection portion and extending through the hopper in a dimension parallel to the central axis, the collection portion having a sloped surface leading to a through-hole extending through the interior wall into the metering chamber; and
a metering cartridge comprising at least a first portion recess oriented in a direction of the collection portion, the metering cartridge movable within the metering chamber, wherein the metering cartridge rotates within the metering chamber about at least one pivot point, wherein the portion recess is filled in a direction radially away from the central axis and dispensed in a direction radially towards the central axis.

9. The dispenser of claim 8, further comprising an actuator assembly having an actuator handle, a trigger pivotably secured to the actuator handle, and a linkage pivotably secured between the trigger and the metering cartridge, wherein actuation of the trigger towards the actuator handle causes the metering cartridge to move within the metering chamber.

10. The dispenser of claim 8 wherein the metering cartridge is a first metering cartridge selected from a plurality of metering cartridges each having a different configuration of at least one portion recess.

11. The dispenser in claim 8 further comprising:
a dispensing base having a base portion, funnel portion, distribution portion, and upper portion, the upper portion defining an interior space, the funnel portion connected to the upper portion, the distribution portion connected to collection portion, and the base portion connected to the distribution portion.

12. The dispenser of claim 8 wherein the hopper is further defined by at least one vertically extending sidewall and the metering chamber is at least partially defined by the at least one vertically extending sidewall and the interior wall.

13. The dispenser of claim 8 wherein the pivot point is eccentric to the central axis.

14. The dispenser of claim 8, wherein the metering cartridge rotates within the metering chamber about at least one pivot point orthogonal to the central axis.

15. The dispenser of claim 8, wherein the portion recess is filled in a direction radially away from the central axis and dispensed radially towards the central axis.

16. A dispenser comprising:
a hopper having a collection portion and a metering chamber adjacent the collection portion and extending through the hopper, the collection portion having a sloped surface leading to a through-hole into the metering chamber; and
a metering cartridge comprising a first portion recess oriented in a direction of the collection portion and a second portion recess adjacent the first portion recess, the first portion recess having a first elongated dimension and the second portion recess having a second elongated dimension, the first elongated dimension being greater than the second elongated dimension;
wherein when the metering cartridge is in a first position the first portion recess and the second portion recess are open to the through-hole, the metering cartridge being translatable to a second position wherein at least a portion of the first portion recess extends exterior of the metering chamber, and the metering cartridge is further translatable to a third position wherein at least a portion of both the first portion recess and the second portion recess extend exterior of the metering chamber.

17. The dispenser of claim 16, wherein the first portion recess and the second portion recess have the same volume.

18. The dispenser of claim 16, wherein the hopper further comprises a central axis and the collection portion is at least partially defined by an interior wall interior to the hopper and the collection portion extends through the central axis, and wherein the metering chamber extends in a dimension parallel to the central axis.

* * * * *